United States Patent [19]

Rhodes

[11] Patent Number: 4,603,716
[45] Date of Patent: Aug. 5, 1986

[54] MACHINE FOR CONTOURING A WORKPIECE

[76] Inventor: William J. Rhodes, 3347 Campground Rd., Louisville, Ky. 40211

[21] Appl. No.: 789,337
[22] Filed: Oct. 21, 1985
[51] Int. Cl.⁴ ............................................. B27C 5/00
[52] U.S. Cl. .............................. 144/134 A; 29/38 C; 29/564.7; 144/134 R; 144/137; 144/154
[58] Field of Search ............... 144/2 R, 134 R, 134 A, 144/137, 154; 409/174, 218; 29/38 C, 564.7

[56] References Cited

U.S. PATENT DOCUMENTS 4,565,229 1/1986 Larson ................................ 144/154

FOREIGN PATENT DOCUMENTS 1143258 4/1957 France ............................... 144/154
582962 12/1977 U.S.S.R. ............................. 144/154

Primary Examiner—W. D. Bray
Attorney, Agent, or Firm—Charles G. Lamb

[57] ABSTRACT

A machine for contouring a workpiece, and more particularly the periphery of the workpiece, includes an oscillating table with two workpiece holding fixtures mounted to the table at two locations spaced from each other by a distance corresponding to the distance through which the table oscillates. The workpiece holding fixtures rotates the workpieces about a fixed position axis. A single workpiece cutting tool is located next to the oscillating table for contouring the periphery of the workpieces in each of the workpiece holding fixtures as the oscillating table moves each workpiece holding fixture into position adjacent to the workpiece cutting table.

15 Claims, 5 Drawing Figures

MACHINE FOR CONTOURING A WORKPIECE

BACKGROUND OF THE INVENTION

1. Field of the Invention

This invention relates to machines for shaping workpieces, and more particularly to machines for contouring the periphery of a workpiece.

2. Description of the Prior Art

Various machines for contouring the periphery of a workpiece are known. The following U.S. patents show examples of some of these machines.

U.S. Pat. No. 1,567,865 teaches a woodworking machine for cutting the marginal edge of a wood workpiece. A workpiece is clamped to a pattern, the outer edge of which has the configuration desired for the workpiece. The outer periphery of the pattern has a rack or perforated band which meshes with the teeth of a gear. As the gear turns, the pattern moves in the direction dictated by the peripheral shape of the pattern. A cutter is located adjacent to the marginal edge of the workpiece. The pattern is mounted to a slide device located beneath the work table for moving the pattern toward and away from the cutter as the workpiece is rotated past the cutter. The workpiece is held down against the top surface of the pattern by means of a cantilevered arm. At the free end of the arm there is a sleeve provided with a spring loaded roller projecting from the bottom end. The roller bears against the top side of the workpiece forcing it downwardly against the top surface of the pattern.

U.S. Pat. No. 1,955,951 teaches a woodworking machine for shaping the periphery of a wood workpiece. A cutter is mounted on the machine bed. The shape of the cutter conforms to the peripheral contour to be cut into the periphery of the workpiece. A rotatable workpiece holder is journaled to a base. The base is mounted at one of its ends by a bolt to the machine bed. The base is manually caused to pivot about the bolt by a handle to move the workpiece mounted onto the rotatable workpiece holder toward and away from the cutter. The workpiece is held down against the top side of the holder by a deadcenter device.

U.S. Pat. No. 3,447,420 teaches an automatic shaper for contouring the periphery of a workpiece. The workpiece is mounted on a template which is in turn mounted on a pallet. The template includes a cam edge or flange which co-acts with an abuttment to determine the movement of the workpiece carried on the template toward and away from a stationary cutter.

U.S. Pat. No. 3,459,104 teaches a router machine for making piercing cut inside cut-outs, inlet routing, top edge routing, or contour edge routing in a workpiece. The route machine includes an attachment having a horizontal work table and a cutter or bit suspended over the work table. The attachment includes a flat body upon which the workpiece is placed. A stationary guide pin projects upwardly from the work table and is received in a guideway formed in the bottom side of the flat body. A cogged track is formed around the periphery of the flat body, and a driven cogwheel at the top surface of the work table engages the cogged track to move the work table in the path determined by the peripheral shape of the guideway in the flat body. The driven cogwheel is mounted for movement toward and away from the flat body so that the cogwheel can be disengaged from the cogged track.

SUMMARY OF THE INVENTION

The present invention is directed toward a relatively straightforward machine for contouring the periphery of a workpiece which provides for the contouring the peripheral edge of one workpiece while removing a finished workpiece from the machine and loading a raw workpiece to be contoured in the machine.

More particularly, the present invention provides a machine for contouring a workpiece comprising a framework, a horizontal table mounted to the framework for oscillating movement in a horizontal plane, means for stopping movement of the table at two predetermined opposed points of its oscillating movement, means for reversibly driving the oscillating table, means operatively interconnecting the stopping means and the table drive means for reversing the drive means when the stopping means stops movement of the table, workpiece holder means for rotatably holding workpieces to be contoured at two different locations on the table spaced from each other by a distance corresponding to the distance through which the table oscillates, means associated with the workpiece holder means for rotating the workpieces, workpiece cutter means mounted to the framework next to the table for contouring the periphery of each workpiece as the table moves a workpiece into a position at the workpiece cutter means, and workpiece hold-down means for holding a workpiece in position on the workpiece holder means as the workpiece is being contoured by the cutter means.

BRIEF DESCRIPTION OF THE DRAWINGS

These and other features of the present invention will become even more clear upon reference to the following description and in conjunction with the accompanying drawing wherein like numbers refer to like parts throughout the views in which.

DETAILED DESCRIPTION OF THE PREFERRED EMBODIMENT

Figure 1:
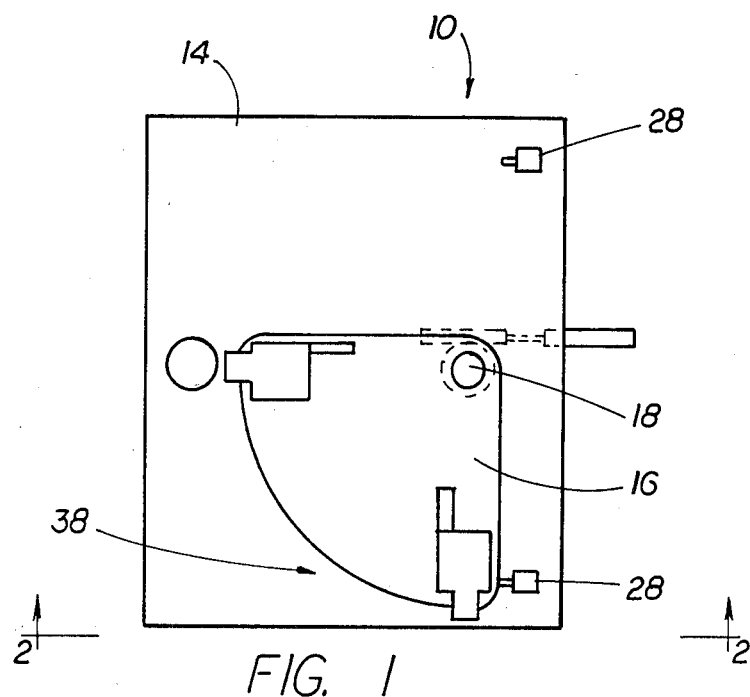
FIG. 1 is a top view of the machine incorporating the features of the present invention.
Figure 2:
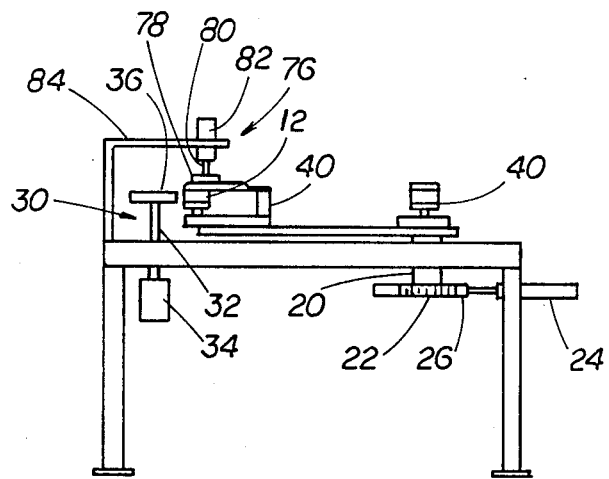
FIG. 2 is a side view of the machine as viewed in the direction of arrows 2—2 in FIG. 1.

FIGS. 1 and 2 illustrate a machine, generally denoted as the numeral 10, for contouring the periphery of a workpiece 12. The workpiece 12 can be of virtually any material, such as wood, plastic or metal and the contour to be formed in the periphery of the workpiece 12 can be virtually any shape. For the sake of illustration, the machine 10, as shown, is used to form a circular peripheral contour to the workpiece 12.

With continued reference to FIGS. 1 and 2, the machine 10 includes a stationary framework 14 which can be supported on, for example, a floor of a manufacturing facility. The framework configuration is incidental to the invention and will, therefore, not be discussed in further detail. A table 16 is mounted to the framework 14 in a generally horizontal plane for oscillating movement in a horizontal plane. Toward this end, the table can be affixed to the framework 12 by a pivot journal 18 for arcuate movement about the pivot 18. In order to drive the table 16 in a reversing oscillatory movement, a drive shaft 20 affixed to the underside of the table 16 depends therefrom coaxially with the pivot journal 18 and has a pinion gear 22 coaxially attached at its depending end. A pneumatic or hydraulic cylinder device 24 is affixed to the framework 14 beneath the table 16 and includes a gear rack 26 coaxially attached to the operating rod of the cylinder device 24. The gear rack 26 is in meshing engagement with the pinion gear 22 so that as the operating rod of the cylinder device extends the oscillating table 16 will be caused to move in one arcuate direction about the pivot journal 18, and as the operating rod of the cylinder device retracts the oscillating table 16 will be caused to reverse and move in the opposite arcuate direction about the pivot journal 18. Limit or stop switch devices 28 are located at the predetermined extremities of movement of the oscillating table 16 generally in the plane of the table 16. These limit switches 28 are operatively associated with the cylinder device 24 in any conventional manner well known to the art to cause the operating rod to extend when the table 16 contacts one of the limit switches 28 and to retract when the table 16 contacts the other one of the limit switches 28.

Workpiece cutter means 30 is mounted to the framework 14 next to the table 16 for cutting a contour in the periphery of a workpiece 12. As shown, the cutter means 30 includes a vertical shaft 32 driven by an electric motor 34. A conventional rotary cutting tool 36 is coaxially mounted on the motor shaft 30 for continuous rotation in one direction in a plane parallel to the plane of movement of the table 16. The shape of the cutting surface of the cutting tool 36 will depend upon the cross-sectional shape of the contour to be formed in the periphery of the workpiece 12.

Figure 5:
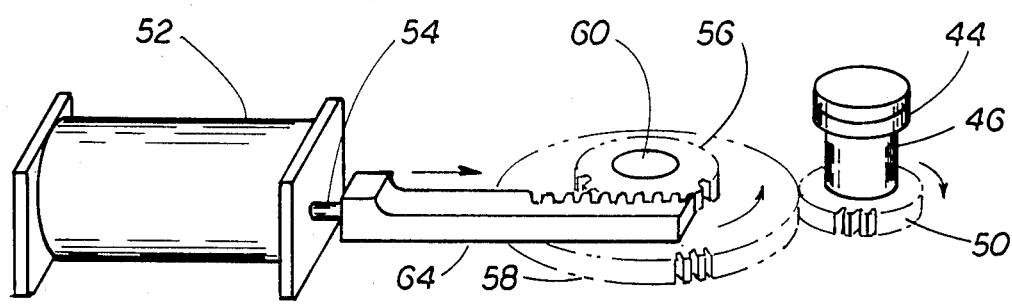
FIG. 5 is a perspective view of a component of the fixture of FIGS. 3 and 4.
Figures 3, 4:
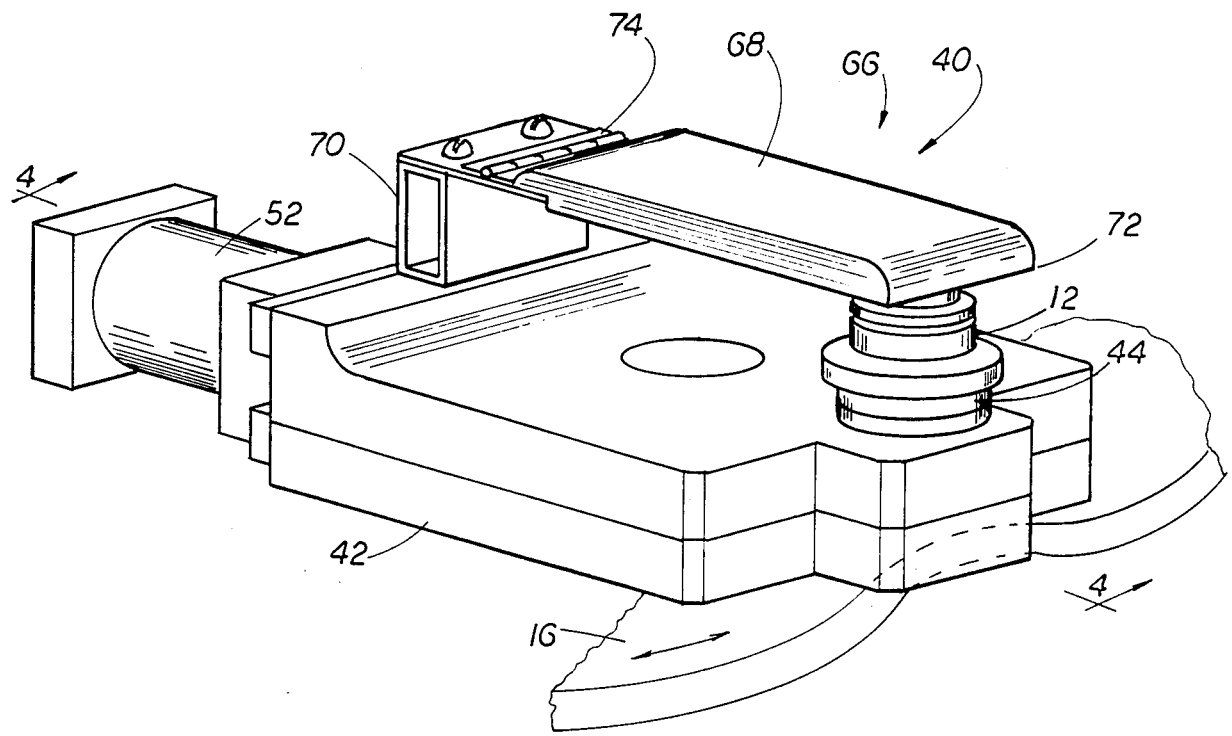
FIG. 3 is an enlarged perspective view of a workpiece holder fixture of the machine.
FIG. 4 is a side view of the fixture as viewed in the direction of arrows 4—4 in FIG. 3.

As shown in FIG. 1, the machine 10 further includes workpiece holder means, generally denoted as the numeral 38, for rotatably holding workpieces 12 to be contoured at two different locations on the table 16 spaced from each other by a distance corresponding to the distance through which the table oscillates. As illustrated, the workpiece holder means 38 includes two identical fixtures 40. With reference to FIGS. 3 and 4, the fixture 40 is mounted to the upper surface of the table 16 by any convenient means, such as, for example, bolts (not shown). The fixture 40 includes a hollow housing 42. A rotatable workpiece support pedestal 44 is located on the top side of the housing 42 and is mounted to the housing for rotation in a horizontal plane by a depending shaft 46 which is mounted in a bearing 48 in the housing 42. With additional reference to FIG. 5, a driving gear 50 is attached to the depending end of the shaft 46 inside the housing 42. The pedestal 44 is caused to rotate about the depending shaft 46 by a pneumatic or hydraulic cylinder device 52. The cylinder device 52 is horizontally located and mounted to the end wall of the fixture 40 with the operating rod 54 extending horizontally into the interior of the housing 42. A pinion gear 56 and coaxial idler gear 58 are located in the interior of the housing and are mounted to a common axle 60. The axle 60 is substantially parallel to the shaft 46 and is supported in a bearing 62 in the housing 42. A gear rack 64 is coaxially affixed to the cylinder device operating rod 54 and is in meshing contact with the pinion gear 56. The idler gear 58 is in meshing contact with the driving gear 50 on the shaft 46. Thus, as the operating rod 54 is caused to extend the workpiece support pedestal 44 rotates in one direction, and when the operating rod 54 is caused to retract the workpiece support pedestal rotates in the other direction. Preferably, the top end of the workpiece support pedestal 44 is covered with a material having a high coefficient of friction with the material of the workpiece 12.

With reference to FIGS. 3 and 4, the fixture 40 also includes workpiece hold-down means, generally denoted as the numeral 66, for holding the workpiece down against the top end of the pedestal 44. As shown, the hold-down means 66 is a cantilevered arm 68 mounted at one end to the fixture housing 42 by a support bracket 70 with the free end 72 of the arm 68 located over the top end of the pedestal 44. The free end 72 of the cantilevered arm 68 is spaced above the top end of the pedestal 44 by a distance generally corresponding to the thickness of a workpiece 12. As shown, the cantilevered arm 68 includes a hinge joint 74 proximate the end mounted to the support bracket 70 so that the cantilevered arm 68 can be pivoted upwardly about the hinge joint 74 to gain unrestricted access to the pedestal 44 for easy loading and unloading of workpieces 12 onto and from the top end of the pedestal 44.

With reference to FIG. 2, the machine 10 also includes hold-down clamping means, generally denoted as the numeral 76, located over the table 16 at the cutting tool 36 for clamping the free-end of the cantilevered arm 68 down against the workpiece 12 on the pedestal 44 while the cutting tool 36 is cutting the contour in the periphery of the workpiece 12. Toward this end, the clamping means 76 is illustrated as workpiece contact plate 78 located above the table 16 at the location of the cutting tool 36 by a distance somewhat greater than the overall height of the pedestal 44 and workpiece 12 supported thereon. The plate 78 is mounted for vertical movement toward and away from the pedestal 44 located at the cutting tool 36. As shown in FIG. 2, the workpiece contact plate 78 is attached to the free end of the piston rod 80 of a vertically oriented pneumatic or hydraulic cylinder device 82. The cylinder device 82 is mounted to the framework 14 by brackets 84.

In operation, a workpiece 12 to be contoured by the cutting tool 36 is loaded into the fixture positioned away from the cutting tool 36 by placing it on the top surface of the pedestal 44 and lowering the cantilevered arm 68 so that the free end 72 rests on the workpiece 12. Next, the pneumatic cylinder device 24 is actuated to pivot or index the table 16 about the pivot 18 moving the fixutre 40 having the workpiece 12 to be contoured into position at the cutting tool 36. The motor 34 driving the cutting tool 36 is continuously rotating the cutting tool 36. As the fixture 40 moves into position at the cutting tool 36, the pneumatic cylinder device 82 is actuated to force the contact plate 78 downwardly against the cantilevered arm 68 holding the workpiece in position on the top end of the pedestal 44. As the table 16 indexes the fixture 40 having the workpiece 12 to be contoured into position at the cutting tool 36, the pneumatic cylinder device 52 is actuated to cause the pedestal 44 to rotate about the depending shaft 46 in the opposite rotational direction from that of the cutting tool 36. Concurrently, the fixture 40 which was positioned at the cutting tool 36 holding the workpiece 12 just previously contoured is moved away from the cutting tool 36 as the table 16 is indexed so that the contoured workpiece 12 can be easily removed by lifting the cantilevered arm 68 away from the pedestal 44.

It should be understood that the sequence of operation of the pneumatic cylinder device 24 moving the table 16, the pneumatic cylinder device 52 causing the pedestal 44 to rotate, and the pneumatic cylinder device 82 moving the hold-down contact plate 78 can be controlled by various devices known to the art, such as, for example solenoid devices.

The foregoing details of the present invention are given primarily for clearness of understanding and no unnecessary limitations should be understood therefrom for modifications will become obvious to one skilled in the art upon reading the disclosure and may be made without departing from the spirit of the invention and scope of the appended claims.

What is claimed:

1. A machine for contouring a workpiece comprising:
    a framework;
    a horizontal table mounted to the framework for oscillating movement in a horizontal plane between two predetermined points;
    means for stopping movement of the table at two predetermined opposed points on its oscillating movement;
    means for reversibly driving the oscillating table operatively connected to the stopping means for reversing the direction of movement of the table when the stopping means stops movement of the table;
    workpiece fixture means for holding workpieces to be contoured at two different locations on the table spaced from each other by a distance corresponding to the distance through which the table oscillates; and,
    workpiece cutter means mounted to the framework next to the table for contouring the periphery of each workpiece in the fixture means as the table means moves a fixture means into a position at the workpiece cutter means.

2. The machine of claim 1 wherein the fixture means comprises:
    rotatably mounted workpiece holder means; and
    means for rotating the workpiece holder means.

3. The machine of claim 2, wherein the fixture further comprises workpiece hold-down means for holding the workpiece in position on the workpiece holder means as the workpiece is being contoured by the cutter means.

4. The machine of claim 1, wherein the horizontal table is pivotally mounted to the framework.

5. The machine is claim 1, wherein the means for reversibly driving the table comprises a rack and pinion device.

6. The machine of claim 5, wherein the means for reversibly driving the table further comprises:
    a fluid operated cylinder device operatively connected to the rack; and,
    the pinion in mesh with the rack is operatively associated with the table.

7. The machine of claim 1, wherein the workpiece fixture means comprises:
    a housing attached to the table for movement therewith;
    a workpiece support pedestal rotatably mounted to said housing; and,
    means for rotating the pedestal.

8. The machine of claim 1, wherein the means for rotating the pedestal comprises a rack and pinion device.

9. The machine of claim 1, wherein the means for rotating the pedestal further comprises a fluid operated cylinder device operatively connected to said rack.

10. The machine of claim 7, wherein the workpiece fixture means further comprises workpiece hold-down means for holding the workpiece in position on the top of the pedestal as the workpiece is being contoured by the cutting means.

11. The machine of claim 10, wherein the workpiece hold-down means comprises a cantilevered arm having the free end located over the top of the pedestal.

12. The machine of claim 11, wherein the cantilevered arm is pivotally mounted for movement toward and away from the top of the pedestal.

13. The machine of claim 11, further comprising hold-down clamping means for forcing the cantilevered arm downwardly toward the top end of the pedestal when the fixture is located at the cutting tool as the workpiece is being contoured.

14. The machine of claim 13, wherein the hold-down clamping means comprises:
    a workpiece contact plate mounted for movement toward and away from cantilevered arm; and,
    means for moving the contact plate toward and away from the cantilevered arm.

15. The machine of claim 13, wherein the hold-down clamping means is located at the cutting tool.

* * * * *